US012000710B2

(12) United States Patent
Voigt et al.

(10) Patent No.: US 12,000,710 B2
(45) Date of Patent: Jun. 4, 2024

(54) METHOD FOR PROVIDING A CURRENT LOCAL ENVIRONMENT STATUS MAP FOR A MOTOR VEHICLE, AND MOTOR VEHICLE FOR CARRYING OUT A METHOD OF THIS KIND

(71) Applicant: AUDI AG, Ingolstadt (DE)

(72) Inventors: Christoph Voigt, Kösching (DE); Thorsten Hehn, Ingolstadt (DE)

(73) Assignee: Audi AG, Ingolstadt (DE)

( * ) Notice: Subject to any disclaimer, the term of this patent is extended or adjusted under 35 U.S.C. 154(b) by 76 days.

(21) Appl. No.: 17/764,873

(22) PCT Filed: Sep. 18, 2020

(86) PCT No.: PCT/EP2020/076130
§ 371 (c)(1),
(2) Date: Mar. 29, 2022

(87) PCT Pub. No.: WO2021/063707
PCT Pub. Date: Apr. 8, 2021

(65) Prior Publication Data
US 2022/0341749 A1    Oct. 27, 2022

(30) Foreign Application Priority Data
Oct. 1, 2019    (DE) ..................... 10 2019 215 099.3

(51) Int. Cl.
*G01C 21/00*    (2006.01)
*G08G 1/16*    (2006.01)

(52) U.S. Cl.
CPC ......... *G01C 21/3837* (2020.08); *G08G 1/166* (2013.01)

(58) Field of Classification Search
CPC ............... G01C 21/3837; G08G 1/166; G01S 2013/9316; G01S 2013/932;
(Continued)

(56) References Cited

U.S. PATENT DOCUMENTS 8,862,384 B2    10/2014  Stahlin et al.
11,073,402 B2    7/2021  Stahlin
(Continued)

FOREIGN PATENT DOCUMENTS

DE         10037572 A1    2/2002
DE     102008036131 A1    3/2009
(Continued)

OTHER PUBLICATIONS

International Search Report and Written Opinion of the International Searching Authority directed to related International Patent Application No. PCT/EP2020/076130, mailed Feb. 2, 2021, with attached English-language translation; 17 pages.
(Continued)

*Primary Examiner* — Jelani A Smith
*Assistant Examiner* — George A Alcorn, III
(74) *Attorney, Agent, or Firm* — Sterne, Kessler, Goldstein & Fox P.L.L.C.

(57) ABSTRACT

The disclosure relates to a method of providing a current local environment status map for a motor vehicle, and to a motor vehicle and a system for carrying out the method. The method includes generating own driving situation data which describe a current, position-related vehicle parameter of the motor vehicle, and generating environment situation data which describe a current arrangement of a further motor vehicle located in a predefined environment of the motor vehicle. The method also includes generating, based on these data, a vehicle environment map which describes a current local traffic situation in the predefined environment. The further vehicle environment maps of the environment of the vehicle are received from the further motor vehicle and are combined with the generated vehicle environment map using a map data evaluation criterion in order to generate an
(Continued)

improved current local environment status map for the motor vehicle.

8 Claims, 1 Drawing Sheet

(58) Field of Classification Search
CPC .... G01S 2013/9322; G01S 7/003; G01S 7/40; G01S 7/497; G01S 13/89; G01S 13/931; G01S 17/89; G01S 17/931
USPC .......................................................... 701/450
See application file for complete search history.

(56) References Cited

U.S. PATENT DOCUMENTS

| | | | | |
|---|---|---|---|---|
| 2004/0073361 | A1* | 4/2004 | Tzamaloukas | H04W 8/04 701/414 |
| 2010/0198513 | A1* | 8/2010 | Zeng | G01S 13/931 701/300 |
| 2017/0025017 | A1* | 1/2017 | Thomas | B60W 10/20 |
| 2019/0261171 | A1* | 8/2019 | Cozzetti | H04W 12/108 |
| 2020/0058306 | A1* | 2/2020 | Sharifi | G10L 15/22 |
| 2020/0104289 | A1* | 4/2020 | Premawardena | G06F 16/182 |
| 2020/0166945 | A1* | 5/2020 | Kim | B60W 50/00 |
| 2020/0183389 | A1 | 6/2020 | Kim et al. | |
| 2020/0207371 | A1* | 7/2020 | Dougherty | B60W 60/0017 |
| 2020/0309538 | A1 | 10/2020 | Gonsa et al. | |

FOREIGN PATENT DOCUMENTS

| | | |
|---|---|---|
| DE | 102009017731 A1 | 11/2009 |
| DE | 102016205543 A1 | 5/2017 |
| DE | 102017210037 A1 | 12/2018 |
| DE | 102017217297 A1 | 3/2019 |
| WO | WO 2019/031851 A1 | 2/2019 |

OTHER PUBLICATIONS

ETSI, "Intelligent Transport Systems (ITS); Vehicular Communications; Basic Set of Applications; Local Dynamic Map (LDM); Rationale for and Guidance on Standardization," ETSI TR 102 863, V. 1.1.1, Jun. 2011; Available at: https://www.etsi.org/deliver/etsi_tr/102800_102899/102863/01.01.01_60/tr_102863v010101p.pdf; 40 pages.

International Preliminary Report on Patentability directed to related International Patent Application No. PCT/EP2020/076130, completed Jan. 4, 2022, with attached English-language translation; 13 pages.

* cited by examiner

METHOD FOR PROVIDING A CURRENT LOCAL ENVIRONMENT STATUS MAP FOR A MOTOR VEHICLE, AND MOTOR VEHICLE FOR CARRYING OUT A METHOD OF THIS KIND

TECHNICAL FIELD

The disclosure relates to a method for providing a current local environment status map for a motor vehicle and a system that is designed to carry out such a method. In addition, the disclosure relates to a motor vehicle and a system by means of which such a current local environment status map is provided in each case.

BACKGROUND

Nowadays, numerous motor vehicles are already linked to one another in road traffic by means of vehicle-to-vehicle communication, via which electronic communication between the individual motor vehicles is possible. Such communication between individual motor vehicles is often referred to as vehicle-to-vehicle (V2V) communication and represents a form of traffic networking that is often referred to as vehicle-to-everything (V2X) communication.

A motor vehicle receives a status message from at least one other motor vehicle in an environment of the motor vehicle, for example, via the relevant vehicle-to-vehicle communication link, the status message including data that describe a current position, speed, travel direction and, if applicable, other driving-related parameters of the other motor vehicle. Using the status message received in this way from the at least one other motor vehicle, in combination with an own status message, which includes data that describe the driving situation of the motor vehicle, the motor vehicle can generate a vehicle environment map which shows both the vehicle's own position and the current position of the at least one other motor vehicle from which the status message was received. Based on the generated vehicle environment map, a driving function for at least partially autonomous driving of the motor vehicle can be assisted in terms of its functionality, for example. The vehicle environment map is typically updated cyclically and adapted to a current traffic situation in the environment of the motor vehicle based on the at least one currently available status message transmitted by means of vehicle-to-vehicle communication.

In this context, DE 10 2008 036 131 A1 shows a method and a device for detecting a traffic situation in the environment of a vehicle. In order to obtain information about other vehicles in the vehicle environment in a simple manner, provision is made here for the vehicle to receive driving dynamics data from the other vehicles by means of vehicle-to-vehicle communication. These data are then combined into a driving dynamics traffic situation map.

DE 10 2017 210 037 A1 shows a method for collision avoidance when maneuvering out of a parking space. Here, among other things, a vehicle-to-vehicle data exchange takes place, which is used to check a position of a detected vehicle on an electronic map.

DE 100 37 572 A1 shows a method for transmitting a route and a location of an emergency vehicle to motor vehicles. This is intended to signal to a driver in one of the motor vehicles at an early stage that an emergency vehicle is driving past. A location and a route of the emergency vehicle are transmitted to the motor vehicles by means of digital radio signals.

DE 10 2009 017 731 A1 describes a device for creating and storing a digital map for a means of transport based on environment sensors, vehicle-to-X communication and satellite navigation systems, without using navigation map data for this.

DE 10 2016 205 543 A1 describes an exchange of digital map data among a plurality of vehicles.

DETAILED DESCRIPTION

It is the object of the disclosure to provide a solution by means of which an improved vehicle environment map can be provided for a motor vehicle.

This object is achieved by the subject matter of the independent claims. Advantageous embodiments with expedient and non-trivial further developments of the disclosure are set forth in the dependent claims, the following description and the FIGURES.

The disclosure is based on the knowledge that nowadays a motor vehicle typically has sensor data from a sensor apparatus of the motor vehicle that can contain information about at least one other motor vehicle in the environment of the motor vehicle. The sensor data are generated, for example, by means of a camera device, a radar device, a Lidar device (Lidar standing for Light Detection And Ranging) or another external sensor of the motor vehicle. By evaluating the sensor data, the motor vehicle can detect a traffic situation in its environment and, for example, by means of a combination with data describing the motor vehicle's own driving situation, can generate a vehicle environment map. In addition, the motor vehicle often has status messages from other motor vehicles in its environment, which are received by the motor vehicle via vehicle-to-vehicle communication. These status messages contain information about the vehicle's own current position, speed, travel direction and possibly other driving-related parameters of the relevant other motor vehicle. Each individual motor vehicle can then generate a vehicle environment map based on its own vehicle data, its own sensor data from the sensor apparatus of the motor vehicle and possibly also taking into account the status messages received from the other motor vehicles.

The generated vehicle environment map is then used in the motor vehicle itself, for example to carry out an at least partially autonomous driving function. However, the created vehicle environment map is not shared with other motor vehicles in the environment of the motor vehicle via vehicle-to-vehicle communication. However, the generated vehicle environment map and, in particular, the reliability and quality of the generated vehicle environment map differs from motor vehicle to motor vehicle. This is because the individual other motor vehicles in the environment of the motor vehicle typically each have a different sensor apparatus, so that the vehicle environment maps generated in the respective motor vehicles can differ significantly from one another. It would therefore make sense to share the generated vehicle environment map with other motor vehicles in order to generate an improved vehicle environment map, so that the motor vehicle can generate the improved vehicle environment map based on its own generated vehicle environment map and the received vehicle environment maps.

The method according to the disclosure for providing a current local environment status map for a motor vehicle is designed to provide an improved vehicle environment map. Within the meaning of the disclosure the improved vehicle environment map is referred to as the current local environment status map. The method according to the disclosure comprises the following steps, each of which is carried out in a specific motor vehicle: First of all, own driving situation data describing a current position-related vehicle parameter of the motor vehicle are generated. This is done by evaluating vehicle data of the motor vehicle. The vehicle data of the motor vehicle are, for example, a current position, a speed, a travel direction, an acceleration, a yaw rate, a steering angle and other parameters describing the current driving behavior of the motor vehicle. In this case, however, the only vehicle data taken into account are those data that describe a current position-related vehicle parameter of the motor vehicle, i.e. that include a reference to the current driving behavior and to a location of the motor vehicle. These data are typically recorded in each case by means of a recording device of the motor vehicle designed for this purpose and are made available, for example, in a central control unit of the motor vehicle. A recording device provided in the motor vehicle may be, for example, a tachometer for recording the current speed and/or a position determination unit of a navigation system for determining coordinates of the current position of the motor vehicle based on data from a global navigation satellite system (GNSS, standing for Global Navigation Satellite System), such as the global positioning system GPS. The evaluation of the vehicle data can therefore be used to generate the own driving situation data of the motor vehicle, which ultimately describe a current position-dependent driving status of the motor vehicle. Thus, the own driving situation data correspond at least in part to the data of a typical status message and/or at least a partial message of the typical status message that conventional motor vehicles transmit to other motor vehicles by means of vehicle-to-vehicle communication.

In a further method step, environment situation data are generated by evaluating sensor data from a sensor apparatus of the motor vehicle. At least one external sensor that detects the environment of the motor vehicle can preferably be used as the sensor apparatus of the motor vehicle. Such an external sensor is, for example, a camera device, such as a front camera, a rear camera and/or respective side cameras of a motor vehicle, a radar device and/or a Lidar device. The sensor apparatus can optionally also be designed to provide the vehicle data of the motor vehicle described above, that is, for example, also to access data from the GNSS.

The environment situation data describe at least one current relative arrangement of at least one other motor vehicle arranged in a predetermined environment around the motor vehicle with respect to the motor vehicle itself. The environment situation data thus ultimately includes position data of other road users driving and/or standing in the environment of the motor vehicle. At least the current positions of the other motor vehicles relative to the current position of the motor vehicle are given here in the form of the current relative arrangements. The sensor apparatus of the motor vehicle is therefore designed to monitor the environment of the motor vehicle and to detect other road users currently located there, to determine their relative arrangement with respect to the motor vehicle itself and to provide this information in the form of the environment situation data. The environment situation data can also include information about the environment surrounding the motor vehicle itself, that is, for example, information about the course of a road, objects in the environment of the motor vehicle, people in the environment of the motor vehicle, currently prevailing lighting conditions, currently prevailing weather conditions and/or traffic flow information. For this purpose, the sensor data of the sensor apparatus are evaluated using appropriate evaluation algorithms, for example by means of an evaluation device of the motor vehicle designed for this purpose, to give the corresponding environment situation data.

In a further method step, the own driving situation data and the environment situation data are evaluated in order to generate a vehicle environment map. The vehicle environment map describes a current local traffic situation in the specified environment of the motor vehicle. The motor vehicle itself is therefore designed to describe the current local traffic situation in the form of a vehicle environment map based on its own vehicle data and the sensor data from its sensor apparatus. The vehicle environment map includes at least the relative arrangement of the at least one other motor vehicle arranged in the environment of the motor vehicle with respect to the motor vehicle itself as well as the current position-related vehicle parameters of the motor vehicle. For example, if the motor vehicle is located on an inner-city two-lane road, three other motor vehicles in the environment of the motor vehicle can be detected using the sensor apparatus of the motor vehicle. Their respective arrangements relative to the motor vehicle are then entered in the vehicle environment map so that it can be seen from this where the motor vehicle is currently located relative to the three other motor vehicles detected in the environment of the motor vehicle. With the help of exact position data as vehicle data, which were determined, for example, using the data from the GNSS, it is even possible to actually locate the motor vehicle and the three other motor vehicles on a map of the environment. For this purpose, the map is provided, for example, by the navigation system of the motor vehicle. In this case, the vehicle environment map includes, for example, precise coordinates in each case of the motor vehicle and the three other motor vehicles.

A further method step includes receiving at least one further vehicle environment map of the relevant at least one other motor vehicle in the environment of the motor vehicle. The individual motor vehicles are thus designed to transmit the particular vehicle environment map generated by them to motor vehicles in the area. This transmission takes place here by means of vehicle-to-vehicle communication. The corresponding communication link between individual motor vehicles takes place, for example, via a mobile data network, for example using the Long Term Evolution (LTE) or Fifth Generation (5G) mobile radio standard, a wireless local area network (WLAN, standing for Wireless Local Area Network) or a short-range communication network (DSRC, standing for Dedicated Short Range Communication), for example based on transponders installed in motor vehicles, each with a smaller communication zone. This makes it possible for the motor vehicle to receive a vehicle environment map, for example from the three other motor vehicles driving in its environment.

The at least one received map of the environment of the vehicle is then combined with the generated vehicle environment map using a map data evaluation criterion. This is done to generate the current local environment status map for the motor vehicle. All received vehicle environment maps are thus compared with the generated vehicle environment map, so that, for example, additional information concerning additional other vehicles that is available to another motor vehicle driving ahead, based on this corresponding received vehicle environment map, is now also available to the motor vehicle that does not detect this additional vehicle itself and therefore does not have it entered on the generated vehicle environment map. In this way, for example, an additional fourth motor vehicle that was not detected in detail by the sensor apparatus of the motor vehicle itself, but was detected by the sensor device of one of the other motor vehicles, can be entered in the current local environment status map. The conditions and regulations under which information from the received vehicle environment maps is transferred to the current local environment status map, in addition to or as an alternative to the data of the generated vehicle environment maps, is predefined using the map data evaluation criterion. This map data evaluation criterion therefore contains, for example, rules for prioritizing individual data packets of the received vehicle environment map and/or the generated vehicle environment map, which are used to determine which data are ultimately taken into account for generating the current local traffic control map and which are not.

Finally, the generated current local environment status map is provided in the motor vehicle. The generated current environment status map is therefore at least available to the motor vehicle itself and can be taken into account by it, for example, when carrying out a driver assistance function for at least partially autonomous driving, such as use of a lane departure warning system. Due to the fact that not only the respective own driving situation data have been exchanged between motor vehicles, as is usually the case nowadays, but also because the vehicle environment map generated by a particular motor vehicle is already shared with other motor vehicles, an improved current local environment status map for the motor vehicle can be provided. This has the great advantage that the motor vehicle can access a greater amount of data, so that, for example, a greater perceptual environment is provided for the motor vehicle using the current local environment status map. In addition, the information provided by a plurality of motor vehicles is advantageously combined. By sharing the relevant vehicle environment map, the motor vehicle also receives via vehicle-to-vehicle communication, in addition to its own and thus intrinsically present information, numerous items of extrinsic information that it does not record itself, but that are provided by other motor vehicles. Ultimately, motor vehicles no longer only exchange information about themselves, but also the vehicle environment map they have generated. This puts each received motor vehicle in a position where it can benefit, for example, from the modern equipment of a motor vehicle in its environment, since, for example, particularly reliable measured sensor data for generating the vehicle environment map of this motor vehicle can also be provided to the other motor vehicles, for example, by exchanging the vehicle environment maps via a comparatively inferior sensor apparatus. As a result, the motor vehicle can thus provide an improved vehicle environment map in the form of the current local environment status map.

According to the disclosure, when the map data evaluation criterion is used, it is checked whether a particular motor vehicle described by the received vehicle environment map is also described by the generated vehicle environment map. It is therefore checked whether, for example, all three other motor vehicles detected by the motor vehicle are also present in the received vehicle environment map. It is checked whether, for example, a motor vehicle that has not yet been described in the generated vehicle environment map is entered in the received vehicle environment map. Ultimately, therefore, differences are sought and determined between the particular received vehicle environment map and the generated own vehicle environment map. If at least one additional motor vehicle that is missing in the own vehicle environment map is described in the particular received vehicle environment map, the at least one additional motor vehicle is included in the generated current local environment status map. It is thus determined, for example, if one of, for example, three received vehicle environment maps describes at least one additional motor vehicle that the motor vehicle itself has not located in its environment using its environment situation data. The additional motor vehicle is then entered in the current local environment status map.

As a result, the motor vehicle improves its perceptual environment and ultimately the current local environment status map. In addition, motor vehicles that are outside the range of the vehicle-to-vehicle communication can thereby be detected. Because both a detection range of the sensor apparatus of the motor vehicle and a surrounding radius from which, for example, own driving situation data of another motor vehicle are received, is limited, it is possible that not all other motor vehicles in the environment of the motor vehicle that are potentially relevant to the driving behavior of the motor vehicle can be detected by the motor vehicle itself. However, it is possible that, for example, another motor vehicle driving a predetermined distance in front of the motor vehicle registers the other road user, i.e. the additional motor vehicle, for example because it detects the additional motor vehicle using its own sensor apparatus and/or receives corresponding own driving situation data from the additional vehicle. In particular with regard to a function of a driver assistance system that controls the motor vehicle at least partially autonomously, it can be advantageous to provide the motor vehicle with a greater perception environment than the motor vehicle itself can generate using the generated vehicle environment map, for example in order to be able to react proactively to potential future traffic situations.

The disclosure also includes further embodiments which offer additional advantages.

In an advantageous embodiment, it is provided that own driving situation data of the other motor vehicle received from at least one other motor vehicle in the environment of the motor vehicle are evaluated in order to generate the environment situation data. The environment situation data are therefore not only based on the sensor data of the sensor apparatus of the motor vehicle itself, but also on the own driving situation data which describe current position-related vehicle parameters of a motor vehicle and have been generated based on the vehicle data of the relevant motor vehicle. The individual motor vehicles in the environment of the motor vehicle therefore not only exchange their respective generated vehicle environment maps with one another, but also their respective status messages, i.e. their respective own driving situation data. Based on such a sensor fusion, i.e. a combination of the respective received own driving situation data of the other motor vehicles with the motor vehicle's own sensor data, the accuracy of the environment situation data and thus ultimately of the generated vehicle environment map can be improved. As a result, the vehicle environment map generated by each motor vehicle itself is particularly reliable and accurate.

An additional embodiment of the disclosure provides that the own driving situation data and/or the environment situation data each comprise a plurality of data packets. A reliability value, which describes how reliable the data in the data packet are, is assigned to each of the plurality of data packets. The data generated by the motor vehicle, i.e. the own driving situation data and/or the environment situation data, each have an indication of accuracy, which is given in the form of the reliability value. However, this is preferably not assigned to the driver's own driving situation data or the environment situation data as a whole, but instead is determined for a particular data packet. This means that, for example, a sensor unit of the sensor apparatus, which is, for example, a front camera of the motor vehicle, is assigned a specific reliability value, whereas the current position of the motor vehicle, which is taken into account using the evaluation of the vehicle data to determine the own driving situation data, is assigned a different reliability value, for example. Similarly, a current speed value, a current determination of the travel direction, a radar device in the motor vehicle, a rear camera and/or an acceleration value provided by an acceleration sensor in the motor vehicle each have their own reliability value. The reliability value is used to specify and quantify the exact value of the particular value recorded by the data packet or the plurality of values that may be included in the relevant data packet. This enables the data packets on which the own driving situation data and/or the environment situation data are based to be evaluated in a simple manner, with the aid of which the reliability of individual information elements of the own vehicle environment map can be determined. The motor vehicle itself can thus estimate how reliable and therefore how precise the individual details of the environment of the motor vehicle stored in its vehicle environment map are.

In some embodiments, when the map data evaluation criterion is used for each received vehicle environment map, it is checked whether at least one data packet on which the received vehicle environment maps is based is assigned a higher reliability value than a corresponding data packet of the own driving situation data and/or environment situation data on which the vehicle's own vehicle environment map is based. The respective reliability values of the individual data packets on which the received vehicle environment map is based are thus received by the motor vehicle together with the received vehicle environment map. It can then be determined whether, for example, a current position of one of the other motor vehicles in the environment of the motor vehicle is specified more precisely in the received vehicle environment map of another motor vehicle than in the generated own vehicle environment map.

Ultimately, the data packet that has the highest reliability value can therefore be determined for each individual sub-element of information on which the current local environment status map is ultimately based. When generating the current local environment status map for the motor vehicle, of the respectively compared data packets only the particular data packet to which the highest reliability value is assigned is taken into account. The current local environment status map that is ultimately generated is thus based on exactly those data packets that each have the highest and therefore maximum reliability values in comparison to all other corresponding data packets that are present. This makes it possible, for example, for poorly-equipped motor vehicles that have an older sensor apparatus, for example, to benefit from the sensor apparatus of motor vehicles with more modern equipment, which are therefore better-equipped in comparison, since their respective data have higher reliability values and with the help of the described comparison between the individual reliability values, the data from the data packet with the highest reliability value are ultimately used even by the poorly-equipped motor vehicle to generate the current local environment status map. This makes it possible for each motor vehicle to generate a current local environment status map that is improved compared to its vehicle environment map.

In some embodiments, if the respective data packets that are compared with one another have a reliability value that lies in a predetermined reliability value range, and the data of the compared data packets have been provided in each case at least indirectly by a predetermined sensor device of the relevant sensor apparatus of the relevant motor vehicle, it is checked whether the data of the respective data packets match within a predetermined deviation range. Therefore, for all sensor data a comparison with one another is always carried out when they have at least a similar reliability value, which is therefore within the specified reliability value range. Thus, if the motor vehicle has a front camera as the specified sensor device of its sensor apparatus, with the front camera having a specific reliability value, and one of the other motor vehicles also has a front camera as the specified sensor device of its sensor apparatus, which also has approximately the same reliability value, so that both reliability values are within the predetermined reliability value range, the sensor data provided by the front camera of the motor vehicle are compared with the sensor data of the front camera of the other motor vehicle. The data of the respective data packets, which were each provided by a corresponding sensor device of the relevant sensor apparatus, are therefore examined directly for possible deviations from one another. If the data of the respective data packets do not match within the specified deviation range, a measurement accuracy check for the specified sensor device of the motor vehicle is activated. If, for example, the sensor data of the front camera of the motor vehicle match the sensor data of the front camera of the other motor vehicle within the specified deviation range, which specifies, for example, a maximum percentage deviation of five percent of the sensor data of the other motor vehicle in relation to the sensor data of the motor vehicle, this is registered and the particular sensor device is classified as measuring with sufficient accuracy. However, if there is a greater deviation, that is to say a deviation that does not fall within the deviation range, this indicates a measurement inaccuracy of at least one of the sensor devices. The measurement accuracy check routine for the specified sensor device, i.e. the front camera, of the motor vehicle is therefore activated.

It is then checked, for example according to the measurement accuracy check routine, whether a measurement range of the specified sensor device has been shifted, for example, due to an external force acting on the sensor device and/or due to dirt, such as dirt on a camera lens of the front camera of the motor vehicle. The measurement accuracy check routine is specified individually for the specified sensor device. The measurement accuracy check routine therefore takes into account, for example, a positioning of the sensor device in the motor vehicle. The measurement accuracy check routine can merely include the determination of a potential measurement error and the output of a corresponding warning message. As an alternative or in addition to this, the measurement accuracy check routine can include a method for cleaning, recalibration and/or another procedure specification for checking and, if necessary, correcting the measurement behavior of the sensor device. It is therefore ultimately possible that, based on the comparison of the individual data packets provided by the motor vehicle itself and the data packets provided to the motor vehicle by the at least one other motor vehicle, the functionality of the sensor apparatus of the motor vehicle can be checked and, if necessary, even corrected. As a result, the reliability of the own driving situation data and the environment situation data of the motor vehicle can be improved by carrying out the measurement accuracy check routine.

In some embodiments, at least one sub-map of the generated vehicle environment map is transmitted to the at least one other motor vehicle in the environment of the motor vehicle. The sub-map is only based on data from data packets of which the reliability value is greater than a predetermined minimum reliability value. In particular, when there is high channel utilization, i.e. vehicle-to-vehicle communications are set up and maintained between a plurality of motor vehicles in the environment, it can make sense if the complete vehicle environment map generated by the motor vehicle is not transmitted to other motor vehicles, but only the described sub-map. This sub-map describes, for example, only motor vehicles in the immediate environment of the motor vehicle, for example the motor vehicle and two other motor vehicles driving in the immediate environment of the motor vehicle in the travel direction in front of or next to the motor vehicle, whereas a third motor vehicle driving further away, for example driving at a distance of 100 meters behind the motor vehicle, is no longer described by the sub-map. It is assumed here that other motor vehicles arranged closer to the motor vehicle are entered in the vehicle environment map with greater reliability than other motor vehicles arranged further away from the motor vehicle. This procedure is therefore based on the overall finding that data packets with a high reliability value, which are potentially interesting for other motor vehicles due in each case to their high reliability value, are generally only used for other motor vehicles in a sub-region of the environment. Whether information from the vehicle environment map is potentially interesting for the at least one other motor vehicle is determined using the specified minimum reliability value, which is selected, for example, in such a way that all the data from data packets that are recorded at a specific distance with a specific type of sensor apparatus and/or, for example, determined by another poorly-equipped motor vehicle, do not fall within the range of the transmitted sub-map. Selection of the sub-map can be load-dependent, i.e. it can be provided that, with a high channel utilization that is above a predetermined utilization value, only the sub-map is transmitted, whereas with a lower channel utilization the entire vehicle environment map is transmitted.

The result of this is that, if necessary, a subset of the current local environment status map is determined and only this subset, which is referred to here as a sub-map, is made available to the other motor vehicles. For this purpose, the sub-map is preferably load-controlled, i.e. defined depending on the utilization of a communication link channel of the vehicle-to-vehicle communication. Nevertheless, in order to always transmit a meaningful sub-map to the other motor vehicles, the particular reliability value which is associated with data taken from an individual data packet and used to generate the sub-map is taken into account. In each case, therefore, only the particularly trustworthy sub-map of the motor vehicle is transmitted to the other motor vehicles. This ensures that there is always a high probability that an added value for the receiving motor vehicle is achieved by receiving the current local environment status map.

In some embodiments, at least one partial environment status map of the current environment status map is transmitted to the at least one other motor vehicle in the environment of the motor vehicle. After each motor vehicle has determined, generated and provided the optimal local environment status map for itself, this map or at least a sub-map thereof, the so-called environment status sub-map of the current environment status map, can be provided for the relevant at least one other motor vehicle. In this case, the environment status sub-map is determined in a manner analogous to the above-described sub-map of the generated vehicle environment map depending on the reliability value of the data from data packets on which the environment status sub-map is based. In addition, a channel utilization of the vehicle-to-vehicle communication can be taken into account.

A further possibility is thus provided that is particularly advantageous for a motor vehicle poorly equipped with sensor devices of the sensor apparatus, by means of which this motor vehicle can benefit from another better-equipped motor vehicle in that at least the environment status sub-map of the generated current local environment status sub-map is transmitted to the motor vehicle. Each motor vehicle that has at least one vehicle-to-vehicle communication interface can thus be provided with an accurate current local environment status map optimized as described above and can take this into account, for example, when carrying out corresponding vehicle functions.

In some embodiments, the generated vehicle environment map and/or the generated current local environment status map is provided in each case as at least one map data packet in a specified data format and/or as serialized map data. Thus, for example, a separate data format can be provided in which the vehicle environment map and/or the current local environment status map can be stored and can be made available, for example, for the at least one other motor vehicle. Alternatively or in addition to this, the vehicle environment map and/or the current local environment status map underlying individual data packets are converted in a structured manner into a sequential form of representation and stored in this form. The vehicle environment map and/or the current local environment status map therefore include, for example, firstly the data set that describes the motor vehicle itself and then, in sequence, the respective data sets for the other motor vehicles found in the environment of the motor vehicle. Ultimately, then, the individual data that describe the individual motor vehicles within the vehicle environment map and/or the current local environment status map are provided as listed data packages. In particular when a modern communication channel, such as a 5G vehicle-to-vehicle communication link, is chosen, such large data packets that can describe the entire vehicle environment map and/or current local environment status map can be transmitted between the motor vehicles. The vehicle environment map and/or the generated current local environment status map of the particular motor vehicle can therefore be exchanged and transmitted between the individual motor vehicles in a particularly reliable manner by means of vehicle-to-vehicle communication. This enables an advantageous and easy dissemination of the respective map data. In addition, the transmitted map data can be transmitted in encrypted form, for which it is possible to use common encryption techniques.

The motor vehicle according to the disclosure is designed to carry out the method described above. This means that the motor vehicle is designed to generate own driving situation data describing a current position-related vehicle parameter of the motor vehicle by evaluating vehicle data of the motor vehicle; to generate environment situation data, which describe at least one current relative arrangement of the motor vehicle with respect to at least one other motor vehicle arranged in a predetermined environment of the motor vehicle, by evaluating sensor data from a sensor apparatus of the motor vehicle; to evaluate the own driving situation data and the environment situation data to generate a vehicle environment map that describes a current local traffic situation in the predefined environment of the motor vehicle; to receive at least one further vehicle environment map of the particular at least one other motor vehicle in the environment of the motor vehicle; to combine the at least one received vehicle environment map with the generated vehicle environment map using a map data evaluation criterion for generating the current local environment status map for the motor vehicle; and to provide the generated current local environment status map to the motor vehicle. The preferred embodiments presented in connection with the method according to the disclosure and the advantages of these embodiments apply accordingly, if applicable, to the motor vehicle according to the disclosure. For this reason, the corresponding embodiments of the motor vehicle according to the disclosure are not described again here.

The motor vehicle is preferably designed as a motor vehicle, in particular as a passenger car or truck, or as a passenger bus or motorcycle.

The system according to the disclosure includes a motor vehicle, as described above, and at least one other motor vehicle from an environment of the motor vehicle. The other motor vehicle is preferably also a motor vehicle as described above. The preferred embodiments presented in connection with the method according to the disclosure and the advantages of these embodiments apply accordingly, if appropriate, to the control device according to the disclosure. For this reason, the corresponding embodiments of the system according to the disclosure are not described again here.

The disclosure also includes a control unit for the motor vehicle. The transmitter has a processor device which is set up to carry out an embodiment of the method according to the disclosure. For this purpose, the processor device can have at least one microprocessor and/or at least one microcontroller and/or at least one FPGA (Field Programmable Gate Array) and/or at least one DSP (Digital Signal Processor). Furthermore, the processor device can have a program code which is configured to carry out the embodiment of the method according to the disclosure when executed by the processor device. The program code can be stored in a data memory of the processor device.

The disclosure also comprises the combinations of the features of the described embodiments.

Figure 1:
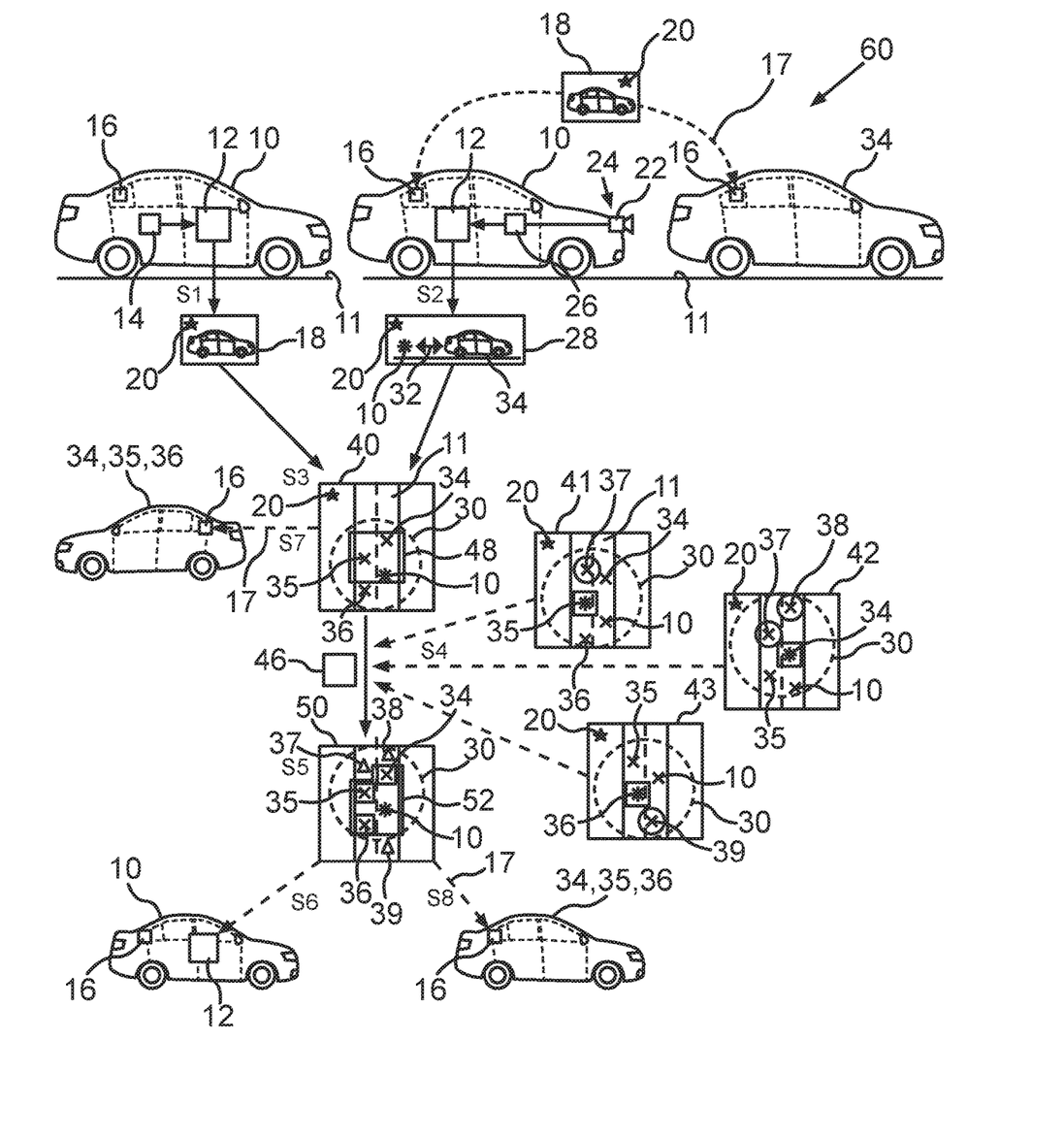
FIG. 1 illustrates a motor vehicle and a current local environment status map, according to some embodiments of the present disclosure.

An embodiment of the disclosure is described by way of example. For this purpose, the only FIGURE shows a schematic representation of a signal flow chart for a method for providing a current local environment status map for a motor vehicle.

The embodiment described below is a preferred embodiment of the disclosure. In the embodiment, the described components of the embodiments each represent individual features of the disclosure which should be considered independently of one another and which each develop the disclosure further independently of one another. The disclosure is therefore also intended to include combinations of the features of the embodiments other than those presented. In addition, features additional to those already described can also be added to the described embodiments.

In the FIGURE, the same reference signs designate elements that have the same function.

A motor vehicle 10 sketched in FIG. 1 is designed to carry out a method for providing a current local environment status map 50 for the motor vehicle 10 by a control unit 12 in interaction with other vehicle components. Vehicle data 14 of the motor vehicle 10 are stored in the motor vehicle 10. The vehicle data 14 can be stored in a memory unit of the motor vehicle 10 or the control unit 12. In addition, the motor vehicle 10 has a communication interface 16. The motor vehicle 10 is currently driving on a road 11.

In a first method step S1, own driving situation data 18 are generated, which describe a current position-related vehicle parameter of the motor vehicle 10. In this case, the own driving situation data 18 are generated by evaluating the vehicle data 14 of the motor vehicle 10. The evaluation can take place by means of the control unit 12. The own driving situation data 18 include a current position, a current speed, a current travel direction on the road 11, a current acceleration and a current yaw rate of the motor vehicle 10. The own driving situation data 18 thus include numerous driving-related parameters of the motor vehicle 10.

At least one other motor vehicle 34 is also located on the road 11. The other motor vehicle 34 is located in a predetermined environment 30 of the motor vehicle 10. The motor vehicle 10 has a front camera 22 which is included as a sensor device of a sensor apparatus 24 of the motor vehicle 10. The sensor apparatus 24 can also include a radar device, a Lidar device and other camera devices, such as a rear camera and/or a side camera. Sensor data 26 of the front camera 22 as a component of the sensor apparatus 24 are transmitted to the control unit 12 in a step S2, so that environment situation data 28 are generated by evaluating the sensor data 26. The environment situation data 28 describe at least one current relative arrangement 32, i.e. at least one distance, of the at least one other motor vehicle 34 from the motor vehicle 10.

Both the own driving situation data 18 and the environment situation data 28 each have a reliability value 20. Strictly speaking, the own driving situation data 18 and the environment situation data 28 each typically include a plurality of data packets and each of the plurality of data packets is assigned a reliability value 20 that describes how reliable data of this data packet are. In the case of the environment situation data 28, for example, a reliability of the front camera 22 as a component of the sensor device 24 is evaluated with regard to its reliability. Analogously, in the context of the own driving situation data 18, for example, the reliability of the vehicle data 14 is taken into account, which, for example, has a particularly high reliability value 20 for determining the position of the motor vehicle 10, but has a comparatively low reliability value 20 for a speed value of the current speed of the motor vehicle 10.

In order to generate environment situation data 28, own driving situation data 18 of the at least one other motor vehicle 34 received from the other motor vehicle 34 are additionally evaluated by the motor vehicle 10. The transmission of the own driving situation data 18 of the other motor vehicle 34 takes place via a vehicle-to-vehicle communication link 17 between the communication interface 16 of the other motor vehicle 34 and the communication interface 16 of the motor vehicle 10.

In a step S3, there then follows an evaluation of the own driving situation data 18 and the environment situation data 28 to generate a vehicle environment map 40 which describes a current local traffic situation of the specified environment 30 of the motor vehicle 10. As shown here, a total of three other motor vehicles 34, 35, 36 are located on the road 11 in the environment 30 of the motor vehicle 10. The motor vehicle 10 is marked here on the vehicle environment map 40 using a star, whereas the other motor vehicles 34, 35, 36 are each marked with a cross. The three other motor vehicles 34, 35, 36 can be detected by the sensor apparatus 24, which includes the front camera 22, among other things, and can be positioned in the environment 30 of the motor vehicle 10 at least based on their relative arrangement 32 with respect to the motor vehicle 10. A boundary line of the environment 30 is shown in the depicted generated vehicle environment map 40 by means of a dashed line.

In a next step S4, at least one additional vehicle environment map 41, 42, 43 is received from the relevant at least one other motor vehicle 34, 35, 36 in the environment 30 of motor vehicle 10. Three further vehicle environment maps 41, 42, 43 are received here, namely the vehicle environment map 41 of the other motor vehicle 35, the vehicle environment map 42 of the other motor vehicle 34 and the vehicle environment map 43 of the other motor vehicle 36. In each of these received vehicle environment maps 41, 42, 43, the motor vehicle 34, 35, 36 that provides the corresponding vehicle environment map 41, 42, 43 is marked with an asterisk.

Here it is now clear that in the total of three additional vehicle environment maps 41, 42, 43 a total of three additional motor vehicles 37, 38, 39 are recorded, which are not recorded in the vehicle environment map 40 generated by the motor vehicle 10. The reason for this is that these additional motor vehicles 37, 38, 39 are detected, for example, using the respective environment situation data 28 of the other motor vehicles 34, 35, 36, but not by the sensor apparatus 24 of the motor vehicle 10, and also are not available in the form of received own driving situation data 18. These three additional motor vehicles 37, 38, 39 are each encircled in the respective received vehicle environment maps 41, 42, 43 and are thus shown with particular emphasis. In addition, the other motor vehicles 35, 34, 36 providing the relevant vehicle environment map 41, 42, 43 are marked in the three received vehicle environment maps 41, 42, 43 by a box. This symbolizes that the data of the corresponding data packets on which these positions within the relevant vehicle environment map 41, 42, 43 are based have a particularly high reliability value 20. The environment 30 of the other motor vehicle 34, 35, 36 providing the corresponding vehicle environment map 41, 42, 43 is shown as the environment 30 in the further vehicle environment maps 41, 42, 43.

In a step S5, the at least one received vehicle environment map 41, 42, 43 is combined with the generated vehicle environment map 40. This is done using a map data evaluation criterion 46 which can be provided in the control unit 12. A current local environment status map 50 for the motor vehicle 10 is generated by this combination. Here the three other vehicle environment maps 41, 42, 43 are combined with the vehicle's own vehicle environment map 40. By using the map data evaluation criterion 46, it is checked whether a particular motor vehicle 10, 34, 35, 36, 37, 38, 39 described by the received vehicle environment map 41, 42, 43 is also described by the generated vehicle environment map 40. If at least one additional motor vehicle 37, 38, 39 is described in the relevant received vehicle environment map 41, 42, 43, but is missing in the own generated vehicle environment map 40, this additional motor vehicle 37, 38, 39 is included in the generated current local environment status map 50. These three additional motor vehicles 37, 38, 39 newly included here are highlighted in the generated current local environment status map 50 by means of triangles. The motor vehicle 10 now has data or information concerning three additional motor vehicles 37, 38, 39 based on the received vehicle environment maps 41, 42, 43.

In addition, when using the map data evaluation criterion 46, it is checked for each received vehicle environment map 41, 42, 43 whether at least one data packet on which the received vehicle environment maps 41, 42, 43 are based is assigned a higher reliability value 20 than a corresponding data packet of the own driving situation data 18 and/or environment situation data 28 on which the own vehicle environment map 40 is based. However, when the current local environment status map 50 is generated by the motor vehicle 10, only the relevant data packet of the respectively compared data packets to which the highest reliability value 20 is assigned is taken into account. Therefore, the data on the other motor vehicles 34, 35, 36 of the current environment status map 50, each rated with a particularly high reliability value 20, is used here as a basis and not the corresponding data relating to the other motor vehicles 34, 35, 36, which are included in the environment situation data 28. This is shown in the depicted current local environment status map 50 by the boxes around the positions of the three other motor vehicles 34, 35, 36.

In a next step S6, the current local environment status map 50 in the motor vehicle 10, that is to say in this case in the control unit 12, is made available for the motor vehicle 10. Now, for example, individual driver assistance systems of motor vehicle 10 can access the current local environment status map 50 when, for example, planning a route or planning control commands.

In particular, in the case of a relatively high channel utilization of the vehicle-to-vehicle communication link 17 in the environment 30 with numerous motor vehicles 10, 34, 35, 36, 37, 38, 39, a sub-map 48 of the generated vehicle environment map 40 is also generated, wherein this sub-map 48 is only based on data from data packets of which the particular reliability value 20 is greater than a predetermined minimum reliability value, that is to say which are evaluated as particularly reliable in comparison to other data from data packets. At least this sub-map 48, but possibly even the entire generated vehicle environment map 40 depending on the channel utilization, is then transmitted in a step S7 to the other motor vehicles 34, 35, 36 in the environment 30 of the motor vehicle 10, specifically via the relevant vehicle-to-vehicle communication link 17.

Analogously, at least one environment status sub-map 52 of the current local environment status map 50 is generated and transmitted via the vehicle-to-vehicle communication link 17 for the other motor vehicles 34, 35, 36 within a communication radius around the motor vehicle 10 in a step S8. In this case, however, the entire environment status map 50 can also be transmitted if necessary.

The generated vehicle environment map 40 and/or the current local environment status map 50 are provided as at least one environment status map packet in a specified data format and/or as serialized map data.

The motor vehicle 10 and the other motor vehicles 34, 35, 36 in the environment 30 of the motor vehicle 10 together form a system 60 which is designed to carry out the method described above.

If the respective data packets compared with one another have a reliability value 20 which lies in a predetermined reliability value range, and the data of the data packets compared with one another have been provided at least indirectly by a specified sensor device of the particular sensor apparatus 24 of the particular motor vehicle 10, 34, 35, 36, it is checked whether the data of the relevant data packets match within a specified deviation range. If the data of the respective data packets do not match within the specified deviation range, a measurement accuracy check routine for the specified sensor device of motor vehicle 10 is activated, since this indicates that the sensor device is not measuring with sufficient accuracy, for example due to dirt or contamination and/or a change in position of the corresponding sensor device of the sensor apparatus 24.

Overall, the examples show a cooperative local dynamic map, i.e. a vehicle environment map 40 that can be shared with one another and an improved current local environment status map 50 provided from a plurality of vehicle environment maps 40, 41, 42, 43. The concept of generating the vehicle environment map 40, known as the concept of the basic safety message, is expanded in such a way that the motor vehicle 10 not only transmits information about itself to road users in the environment 30, i.e. to other motor vehicles 34, 35, 36, but also exchanges complete vehicle environment maps 40 with them. This is done via the vehicle-to-vehicle communication link 17.

This can be implemented by storing the individual vehicle environment maps 40 of the individual motor vehicles 10, 34, 35, 36 as a new message that is formatted in a special data format, for example. As a result, the channel utilization of the vehicle-to-vehicle communication links 17 increases by a maximum of a linear factor that depends on the number of vehicle-to-vehicle communication links 17. This can be implemented in particular with modern communication options such as the 5G vehicle-to-infrastructure standard. It should be noted that the number of vehicle-to-vehicle communication links 17 transmitted, i.e. the data determined via the vehicle-to-vehicle communication links 17, can be only a subset of the data present in the vehicle environment map 40 and/or the current local environment status map 50, that is, only the sub-map 48 and/or the environment status sub-map 52 are transmitted. This can be implemented by the individual motor vehicles 10, 34, 35, 36 in a load-controlled manner. Depending on the utilization of the vehicle-to-vehicle communication channels, either the entire vehicle environment map 40 or the partial map 48 or the entire environment status map 50 or only the environment status sub-map 52 can be transmitted to the other motor vehicles 34, 35, 36.

The invention claimed is:

1. A method for providing a current local environment status map for a motor vehicle, comprising:
    generating own driving situation data describing a current position-related vehicle parameter of the motor vehicle by evaluating vehicle data of the motor vehicle;
    generating environment situation data, which describe, relative to the motor vehicle, a current arrangement of a further motor vehicle located in a predefined environment of the motor vehicle, by evaluating sensor data of a sensor apparatus of the motor vehicle, wherein:
        the own driving situation data and/or the environment situation data each include a plurality of data packets; and
        each data packet of the plurality of data packets is assigned a reliability value that describes reliability of data in each data packet of the plurality of data packets;
    evaluating the own driving situation data and the environment situation data to generate an own vehicle environment map which describes a current local traffic situation in the predefined environment of the motor vehicle;
    receiving a further vehicle environment map from the further motor vehicle;
    combining the received further vehicle environment map with the generated own vehicle environment map using a map data evaluation criterion to generate the current local environment status map for the motor vehicle, comprising:
        checking whether at least one data packet, on which the received further vehicle environment map is based, is assigned a higher reliability value than a corresponding data packet of the own driving situation data and/or the environment situation data on which the generated own vehicle environment map is based;
        taking into account only a relevant data packet of respective compared data packets that is assigned a highest reliability value to generate the current local environment status map for the motor vehicle;
        checking whether a particular motor vehicle described by the received further vehicle environment map is also described by the generated own vehicle environment map; and
        including the particular motor vehicle in the generated current local environment status map when the particular motor vehicle is described in the received further vehicle environment map, but is missing in the generated own vehicle environment map; and
    providing the generated current local environment status map to the motor vehicle.

2. The method according to claim 1, further comprising:
    evaluating the own driving situation data of the motor vehicle to generate the environment situation data.

3. The method according to claim 1, further comprising:
    if reliability values of the respective compared data packets are within a predetermined reliability value range, and if data of the respective compared data packets have been provided at least indirectly by a specified sensor device of a specified sensor apparatus of a specified motor vehicle,
    checking whether data of the relevant data packet are within a specified deviation range; and
    activating a measurement accuracy check routine for the specified sensor device of the specified motor vehicle if the data of the respective compared data packets are not within the specified deviation range.

4. The method according to claim 1, further comprising:
    transmitting a sub-partial map of the generated own vehicle environment map to the further motor vehicle, wherein the sub-partial map is only based on data from the plurality of data packets of which a particular reliability value is greater than a predetermined minimum reliability value.

5. The method according to claim 1, further comprising:
    transmitting at least one environment status sub-map of the current local environment status map to the further motor vehicle.

6. The method according to claim 1, further comprising:
    providing the generated own vehicle environment map and/or the generated current local environment status map as at least one map data packet in a specified data format and/or as serialized map data.

7. A motor vehicle, comprising:
    a memory unit;
    a sensor apparatus;
    a communication interface; and
    a control unit, configured to:
        generate own driving situation data describing a current position-related vehicle parameter of the motor vehicle by evaluating vehicle data of the motor vehicle;

generate environment situation data, which describe, relative to the motor vehicle, a current arrangement of a further motor vehicle located in a predefined environment of the motor vehicle, by evaluating sensor data of the sensor apparatus, wherein:
  the own driving situation data and/or the environment situation data each include a plurality of data packets; and
  each data packet of the plurality of data packets is assigned a reliability value that describes reliability of data in each data packet of the plurality of data packets;
evaluate the own driving situation data and the environment situation data to generate an own vehicle environment map which describes a current local traffic situation in the predefined environment of the motor vehicle;
receive a further vehicle environment map from the further motor vehicle;
combine the received further vehicle environment map with the generated own vehicle environment map using a map data evaluation criterion to generate the current local environment status map for the motor vehicle, wherein to combine the received further vehicle, the control unit is further configured to:
  check whether at least one data packet, on which the received further vehicle environment map is based, is assigned a higher reliability value than a corresponding data packet of the own driving situation data and/or the environment situation data on which the generated own vehicle environment map is based;
  take into account only a relevant data packet of respective compared data packets that is assigned a highest reliability value to generate the current local environment status map for the motor vehicle;
  check whether a particular motor vehicle described by the received further vehicle environment map is also described by the generated own vehicle environment map; and
  include the particular motor vehicle in the generated current local environment status map when the particular motor vehicle is described in the received further vehicle environment map, but is missing in the generated own vehicle environment map; and
provide the generated current local environment status map to the motor vehicle.

8. A system, comprising:
a motor vehicle; and
a further motor vehicle in a predefined environment of the motor vehicle, wherein the motor vehicle is configured to:
  generate own driving situation data describing a current position-related vehicle parameter of the motor vehicle by evaluating vehicle data of the motor vehicle;
  generate environment situation data, which describe, relative to the motor vehicle, a current arrangement of the further motor vehicle located in the predefined environment of the motor vehicle, by evaluating sensor data of a sensor apparatus of the motor vehicle, wherein:
    the own driving situation data and/or the environment situation data each include a plurality of data packets; and
    each data packet of the plurality of data packets is assigned a reliability value that describes reliability of data in each data packet of the plurality of data packets;
  evaluate the own driving situation data and the environment situation data to generate an own vehicle environment map which describes a current local traffic situation in the predefined environment of the motor vehicle;
  receive a further vehicle environment map from the further motor vehicle;
  combine the received further vehicle environment map with the generated own vehicle environment map using a map data evaluation criterion to generate the current local environment status map for the motor vehicle, wherein to combine the received further vehicle, the motor vehicle is further configured to:
    check whether at least one data packet, on which the received further vehicle environment map is based, is assigned a higher reliability value than a corresponding data packet of the own driving situation data and/or the environment situation data on which the generated own vehicle environment map is based;
    take into account only a relevant data packet of respective compared data packets that is assigned a highest reliability value to generate the current local environment status map for the motor vehicle;
    check whether a particular motor vehicle described by the received further vehicle environment map is also described by the generated own vehicle environment map; and
    include the particular motor vehicle in the generated current local environment status map when the particular motor vehicle is described in the received further vehicle environment map, but is missing in the generated own vehicle environment map; and
  provide the generated current local environment status map to the motor vehicle.

* * * * *